Feb. 28, 1956  W. D. FORD  2,736,143
METHOD OF PORE CLOSURE FOR DOUBLE GLAZED UNIT
Filed April 16, 1952

INVENTOR.
WALTER D. FORD
BY
Oscar L. Spencer
ATTORNEY

United States Patent Office 2,736,143
Patented Feb. 28, 1956

2,736,143

METHOD OF PORE CLOSURE FOR DOUBLE GLAZED UNIT

Walter D. Ford, Port Allegany, Pa., assignor, by mesne assignments, to Pittsburgh Plate Glass Company, Pittsburgh, Pa., a corporation of Pennsylvania Application April 16, 1952, Serial No. 282,620

5 Claims. (Cl. 49—82)

The present invention relates to double glazed units comprising spaced sheets of glass hermetically sealed together about their edges and it has particular relation to the sealing of pores or vents employed for the equalization of pressures between the inside and outside of the unit during manufacture and for inserting an amount of dry gas in the interior of the unit.

It is known that windows comprising spaced sheets of glass, the edge portions of which are appropriately sealed together to contain a dead air space, provide a good insulating glazing. One method for forming a hermetically sealed double glazed unit is set forth in U. S. Patent No. 2,389,360. This method comprises applying stripes of a conductive material, such as aquadag, near the edges of two sheets of glass, supporting the sheets in horizontal position one above the other, passing an electrical current through the stripes to generate heat sufficient to soften the contiguous glass and allowing the edge portions of the upper sheet to drop down. The dropped edge portions are then brought into contact with the lower sheet and the contacting portions of the glass are fused together to provide a continuous welded glass seal. The welded units are then cooled in a lehr to anneal the glass.

In a later and improved technique as disclosed in an application of William R. Clever and Harry O. Phalin, filed March 14, 1950, Serial No. 149,562, now Patent No. 2,624,979, and entitled "Welded Double Glazing Unit," two sheets of glass are juxtaposed with only about a sixteenth of an inch space between them. Preferably, the upper sheet is about a quarter or an eighth of an inch wider than the lower, in both horizontal dimensions. The upper sheet is also provided with marginal conductive stripes and one of the sheets, preferably the upper one, is provided with a pore hole usually near a corner. The sheet with the electrically conducting stripes on it is heating electrically at the margins so that the margins drop and become thoroughly welded to the lower sheet. The upper sheet is then pulled upwardly, by a vacuum device, to provide the necessary spacing of the sheets and may be vibrated up and down slightly to cause the glass at the union to become more thoroughly filleted. Subsequently, the units are annealed and the vents are sealed by the technique herein described.

It has also been proposed to form glass sealed, double glazed units by spacing sheets of glass by means of strips of glass, the edges of which have been coated with a paste or a powder of a glass having a low fusion point, and then heating the assembly to fuse the paste and provide a seal between the joints of the assembly.

In forming units by these and similar methods, it will be obvious that the gases between the sheets of glass become highly heated and expand. As these heated gases cool down during the annealing operations, the gases contract thus tending to set up a vacuum within the unit. In order to prevent the collapsing or shattering of the unit by the resultant differential pressure, the units are customarily formed with small openings at some convenient point through which gases can enter the units.

Unless these small pore holes or vents are adequately sealed after the units are cooled, water vapors could enter the units at will and thus destroy their utility. The adequate sealing of these pore holes or vents are constituted one of the main problems in the construction of units formed by welding the edges of the glass sheets together. Practically all organic adhesive materials are characterized by permeability to moisture and may even contain moisture themselves. Therefore, where the pore holes are sealed with organic plastics alone, water vapors soon enter the unit.

The present invention is based upon the provision of a structure suitable as a closure for the pore opening of a welded or otherwise formed double glazed unit which comprises a glass capillary tube in the pore opening, one end of the tube being connected to the walls of the pore opening and the other end of the tube being sealed. The sealing of the capillary tube may be accomplished by appropriate means, for example, by use of a low fusion point glass or by merely heating the end of the tube to cause it to soften and close over the capillary opening.

For a better understanding of the invention, reference may now be had to the accompanying drawing in which like numerals refer to like parts throughout and in which.

Figure 1:
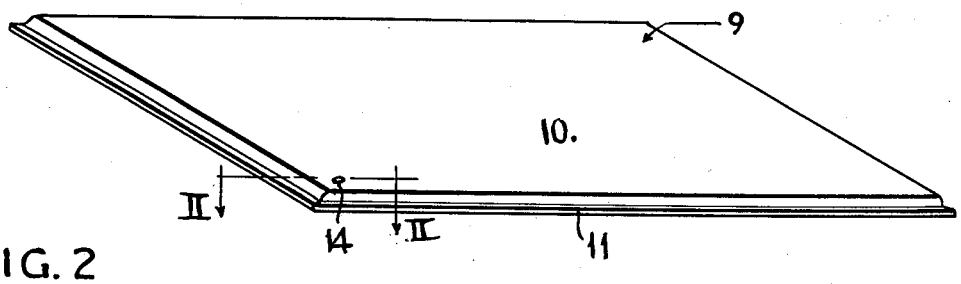
Fig. 1 is a diagrammatic view of a double glazed unit embodying the invention.
Figure 2:
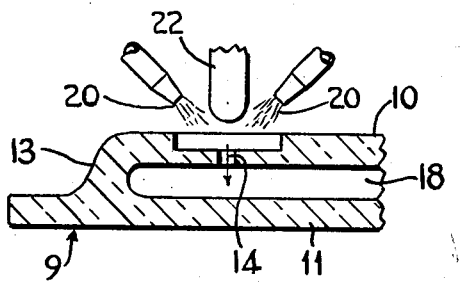
Fig. 2 is a view partially in section and partially in elevation taken along line II—II of Fig. 1 illustrating a method of forming a closure structure in a double glazed unit.

A double glazed unit 9 embodying the principles of the invention comprises spaced sheets of glass 10 and 11 as shown in Figs. 1 and 2. The former sheet 10 may have marginal portions 13 bent down and welded to the upper face of sheet 11 by the process and apparatus shown in U. S. Patent No. 2,389,360. The welding may be substantially at the edge of the sheet 11 as shown in the drawing, or it may be spaced a distance from the edge of sheet 11 in order to provide a flange which is one thickness of glass and which may be puttied or otherwise secured in the opening which it is desired to close.

The pore hole or vent is indicated generally by the numeral 14 and may be disposed at any convenient point in the unit, but as shown in the drawings, it is usually disposed near the edge of upper sheet 10 and preferably near a corner of said sheet. A single opening may be formed, but other openings may be provided as necessary or desired. Dry gases, such as dehumidified air, can be blown into the opening in order to quickly sweep out moist gases within the chamber 18.

The pore closure structure and several of the stages embodied in the installation thereof as applied to the units prepared in accordance with U. S. Patent No. 2,383,360 or the Clever et al. application, are shown in a greatly enlarged scale in Figs. 2 and 3 of the drawing. The structure as shown includes an opening 14 near the edge portion of sheet 10. This opening is shown as a cylindrically bored hole in the sheet 10, but the opening may be outwardly flared, for example at an angle of approximately 60 to 75° at its outer face. Other angles of taper may be employed as well as combinations of various tapers if desired. For example, the opening 14 may be tapered at the inner and outer faces of glass sheet 10 and the intermediate portion may be cylindrically bored or slightly tapered.

In the formation and sealing of the unit in accordance with the provisions of the present invention, the techniques of heating the glass and uniting the heated portions to form the units follow conventional procedures such as are exemplified by the above mentioned patent and pending application. A glass sheet that has been appropriately bored to form a pore hole as indicated in Fig. 1 and 2 of the drawing is employed as one sheet 10 of the unit. The sheets 10 and 11 are thoroughly cleaned and stripes of a conductive material such as "aquadag" are applied to the marginal edges of at least one of the sheets. These stripes may be applied by rollers, by brushing, or by any other appropriate technique.

Figure 3:
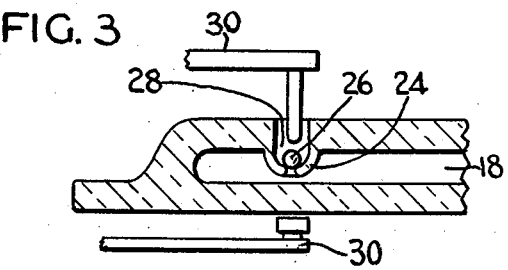
Fig. 3 is a view partially in section and partially in elevation illustrating a method of sealing a pore closure structure formed by the method illustrated in Fig. 2, and Figs. 4 and 5 are views partially in section and partially in elevation of a further method of forming a closure structure in a double glazed unit.

The sheets are then superposed in spaced relation and current is applied to the conductive stripes to soften, form and fuse together the edges of the sheets. The heating is in accordance with the technique described in the foregoing patent and pending application. When the sheets 10 and 11 are still at a high temperature due to the welding process, the glass in the area around the pore opening is heated by means of a gas and oxygen flame 20 to a temperature above the softening point of the glass, for example 2000° F., and a graphite die 22 in the form of a rod of capillary dimensions, for example one thirty-second of an inch or smaller, is dropped or forced down on the heated edges of the hole to form a capillary tube 24 as shown in Fig. 3. The heated glass does not adhere to the graphite rod and the rod may be withdrawn after a suitable capillary has been formed. The capillary tube is formed by the action of the die 22 against the softened portions of the heated glass surrounding the pore opening, which opening has shrunk into capillary size as a result of the localized heating. A stainless steel rod coated with calcium hydroxide may be used in lieu of graphite rod 22.

The heating of the glass around the pore hole 14 prior to insertion of the graphite rod 22 is done while the glass is at at temperature slightly above its annealing temperature, for example, while the glass is still in the welding furnace. This is necessary in order to prevent fracture of the glass by localized heating with the gas and oxygen flame 20. This localized heating could not be done after the unit has been removed from the furnace and cooled, for the excessive stresses caused in the glass due to localized heating of the cool glass would cause fractures. During this localized heating the diameter of the pore hole will be decreased slightly.

Fig. 3 illustrates a method of closing the pore structure as formed by the method illustrated in Fig. 2. In this method of sealing the capillary tube 24, a bead 26 of low fusion point glass is inserted in the capillary tube and this bead is then covered with a dielectric material 28 such as magnesium dioxide. The bead is then fused to the capillary tube by the application of high frequency current to the dielectric material 28 by means of electrodes 30.

Figure 4:
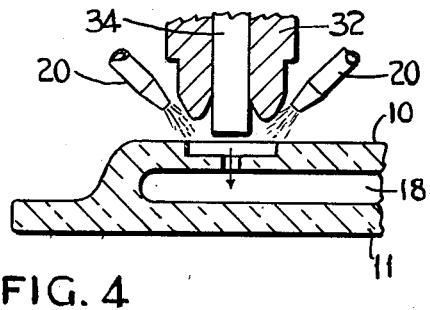
Figure 5:
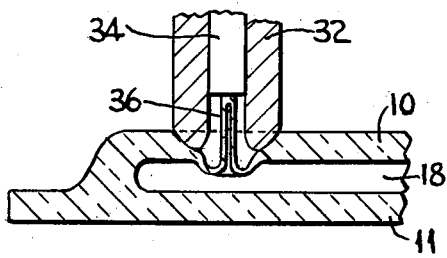

A method of forming an external capillary tube in accordance with the present invention is shown in Figs. 4 and 5 of the drawing. Glass sheets 10 and 11 are welded together and the glass around the pore hole is locally heated by means of a gas and oxygen flame 20 as described above. In accordance with this embodiment, a graphite tube 32 having a metal wire or tube 34 in the center thereof is pressed or dropped down on the heated areas of the glass surrounding the pore opening. The metal wire or rod 34, which may be a stainless steel wire or rod, is initially heated to a temperature of about 2000° F. in order that it be at a temperature of not lower than 1200° F. at the time of its contact with the heated glass surrounding the pore opening. The heated glass of sheet 10 will adhere to the metal rod 34, but not to the graphite tube 32. After the graphite tube and metal rod have been brought into contact with the glass and the glass has adhered to the metal rod 34, the metal rod is withdrawn, thereby drawing the glass upwardly in the graphite tube. The heated glass surrounding the pore opening of sheet 10 adheres to the rod upon its removal and an external glass capillary tube 36 is formed. The tube is formed by drawing out the glass surrounding the pore hole and adhered to the rod a sufficient distance to narrow the diameter of the tube to capillary dimensions. The capillary thus formed is broken from the metal rod to provide an opening into the interior 18 of the unit so that moist gases therein may be purged by means of a dry gas, such as dehumidified air, and the graphite tube is removed.

After purging the interior of the unit, the glass capillary tube 36 is sealed. One method of sealing the capillary tube 36 is to direct a flame at the top of the capillary tube and as the glass melts a small bead is formed at the top of the tube. As the heating is continued the bead moves down the capillary tube to a level which is below the surface of the glass sheet 10. One of the advantages of this type of capillary tube is that it can be easily sealed from the outside of the double glazed unit.

After the capillary tube 36 has been sealed by this means or other appropriate means, the depressions in sheet 10 and area around the capillary tube may be filled in to prevent breakage of the capillary tube by appropriate plastics such as rubber latex suspensions, synthetic rubber such as thiocol, methyl methacrylate polymers, rubber polymers and isomers, vinyl acetal resins such as are employed in safety glass and many other mastic compositions.

The application of the principles of the invention to the sealing of pore holes in double glazed units is not limited to the process or product illustrated in Patent No. 2,389,360 or to the product of process illustrated in the pending application of Clever et al. It will be understood by those skilled in the art that the embodiments of the invention herein described are given by way of example. Various modifications may be made therein without departure from the spirit of the invention or the scope of the appended claims.

I claim:

1. A method of sealing a pore opening of a double glazing unit comprising the steps of providing a pore opening in the face of one of the two spaced glass sheets forming the unit, heating the glass in the area surrounding the pore opening, projecting a hollow tube of graphite having a rod of diameter greater than the pore opening in the center of the graphite tube centrally into the heated glass edges around the pore for a short distance, withdrawing the rod to form a capillary tube and thereafter sealing the capillary tube.

2. A method of sealing a pore opening of a multiple glazed unit comprising the steps of providing a pore opening in one of the glass members which form the unit, heating the glass in the area surrounding the pore opening, projecting centrally against the heated glass edges around the pore opening a hollow tube having in the center thereof a rod of glass-wettable material of diameter greater than the pore opening so as to adhere the rod to the edges, withdrawing the rod and glass adhered thereto to form a capillary tube and thereafter sealing the capillary tube.

3. A method of sealing a pore opening of a multiple glazed unit comprising the steps of providing a pore opening in one of the glass members which form the unit, heating the glass in the area surrounding the pore opening, applying an attenuating force to the heated glass edges of the pore opening by means of a material which adheres to the heated glass edges to attenuate them into a capillary tube and thereafter sealing the tube.

4. A method of sealing a pore opening in one of the glass members of a multiple glazed unit which comprises the steps of heating the glass in the area surrounding the pore opening, projecting centrally against the heated glass edges around the pore opening a hollow tube having in the center thereof a rod of glass wettable material of diameter greater than the pore opening so as to adhere the rod to the heated edges, withdrawing the rod and glass adhered thereto to form a capillary tube and thereafter sealing the capillary tube.

5. A method of sealing a pore opening in one of the glass members of a multiple glazed unit which comprises the steps of heating the glass in the area surrounding the pore opening, projecting centrally against the heated glass edges around the pore opening a rod of glass wettable material of diameter greater than the pore opening so as to adhere the rod to the edges, moving the rod and glass adhered thereto in a line corresponding to a center line drawn through the pore opening to form a capillary tube and thereafter sealing the capillary tube.

References Cited in the file of this patent

UNITED STATES PATENTS

| | | |
|---|---|---|
| 1,448,351 | Kirlin | Mar. 13, 1923 |
| 1,793,039 | Yetter | Feb. 17, 1931 |
| 2,000,560 | Eitel et al. | May 7, 1935 |
| 2,389,360 | Guyer et al. | Nov. 20, 1945 |
| 2,497,545 | Greiner | Feb. 14, 1950 |
| 2,499,854 | Ellefson | Mar. 7, 1950 |